US012766634B2

(12) United States Patent
Rondepierre et al.

(10) Patent No.: US 12,766,634 B2
(45) Date of Patent: Oct. 20, 2026

(54) SYSTEM AND METHOD FOR TREATING MATERIAL BY LASER SHOCK UNDER CONFINEMENT IN A LIQUID

(71) Applicants: THALES, Courbevoie (FR); CENTRE NATIONAL DE LA RECHERCHE SCIENTIFIQUE, Paris (FR)

(72) Inventors: Alexandre Rondepierre, Elancourt (FR); Yann Rouchausse, Paris (FR); Laurent Berthe, Paris (FR)

(73) Assignees: THALES, Courbevoie (FR); CENTRE NATIONAL DE LA RECHERCHE SCIENTIFQUE, Paris (FR)

( * ) Notice: Subject to any disclaimer, the term of this patent is extended or adjusted under 35 U.S.C. 154(b) by 687 days.

(21) Appl. No.: 18/267,761

(22) PCT Filed: Dec. 13, 2021

(86) PCT No.: PCT/EP2021/085505
§ 371 (c)(1),
(2) Date: Jun. 15, 2023

(87) PCT Pub. No.: WO2022/128926
PCT Pub. Date: Jun. 23, 2022

(65) Prior Publication Data

US 2024/0042549 A1 Feb. 8, 2024

(30) Foreign Application Priority Data

Dec. 17, 2020 (FR) ....................................... 2013433

(51) Int. Cl.
*B23K 26/122* (2014.01)
*B23K 26/0622* (2014.01)
(Continued)

(52) U.S. Cl.
CPC ........ *B23K 26/122* (2013.01); *B23K 26/0622* (2015.10); *B23K 26/064* (2015.10); *B23K 26/356* (2015.10)

(58) Field of Classification Search
CPC ......................... B23K 26/356; B23K 26/0622; B23K 26/122; B23K 26/352; B23K 26/0006;
(Continued)

(56) References Cited

U.S. PATENT DOCUMENTS 10,745,776 B2 8/2020 Zhou et al.
2014/0161710 A1* 6/2014 Zousman .................. B01J 3/08 422/127
(Continued)

FOREIGN PATENT DOCUMENTS

CN 103014314 A 4/2013
JP 2005-294325 A 10/2005
(Continued)

OTHER PUBLICATIONS

English translation of the Notice of Reasons for Rejection issued in Japanese Patent Application No. 2023-537009 dated Sep. 16, 2025.
(Continued)

*Primary Examiner* — Vy T Nguyen
(74) *Attorney, Agent, or Firm* — BakerHostetler

(57) ABSTRACT

A system for treating a target by laser shock in a regime of confinement in a liquid, the system includes a pulsed laser generating a beam having a pulse duration of between 1 ns and 30 ns and a wavelength, a concentrating optical device having a focal length and configured to concentrate the beam on the surface of the target, the incident laser beam on the concentrating device having a diameter, a tank filled with the liquid having a refractive index n, a desired value of the diameter of the beam on a surface of the target being predetermined and named Dst, a thickness of liquid passed
(Continued)

through by the beam before reaching the surface of the target being chosen such that a laser intensity on the surface of the liquid (Isl) is less than or equal to a laser intensity on the surface of the target (Ist) divided by 2.

7 Claims, 6 Drawing Sheets

(51) Int. Cl.
*B23K 26/064* (2014.01)
*B23K 26/356* (2014.01)

(58) Field of Classification Search
CPC .............. B23K 26/0648; B23K 26/127; B23K 2101/001; B23K 2103/26; B23K 26/0604; B23K 26/0643; B23K 26/348; B23K 26/3576; B23K 26/57; B23K 26/705; B23K 2103/04; B23K 2103/05; B23K 2103/50; B23K 2103/52; B23K 26/00; B23K 26/06; B23K 26/0624; B23K 26/0665; B23K 26/067; B23K 26/0676; B23K 26/073; B23K 26/0876; B23K 26/106; B23K 26/1224; B23K 26/146; B23K 26/361; C21D 10/005; C21D 10/00; C21D 7/06; B23P 15/10; G02B 6/32; G02B 6/3624; G02B 6/4296
USPC ............................ 219/121.6, 121.69, 121.85
See application file for complete search history.

(56) References Cited

U.S. PATENT DOCUMENTS

| | | | |
|---|---|---|---|
| 2016/0265474 | A1 | 9/2016 | Niimi et al. |
| 2016/0288258 | A1 | 10/2016 | Nomura et al. |
| 2019/0010576 | A1 | 1/2019 | Sheng et al. |

FOREIGN PATENT DOCUMENTS

| | | | |
|---|---|---|---|
| JP | 2007-237192 | A | 9/2007 |
| JP | 2010-247213 | A | 11/2010 |
| JP | 2015-506887 | A | 3/2015 |
| JP | 2015-105402 | A | 6/2015 |
| WO | 2015/062457 | A1 | 5/2015 |

OTHER PUBLICATIONS

Sollier, et al., “Laser-matter interaction in laser shock processing”, First international symposium on High power laser Macroprocessing, SPIE n° 4831, pp. 463-467, 2003.
Wang, et al., “Effects of laser shock peening on stress corrosion behavior of 7075 aluminium alloy laser welded joints”, Material Science & Engineering A647, pp. 7-14, 2015.
Berthe, et al., “State-of-the-art laser adhesion test (LASAT)”, Nondestructive Testing and Evaluation, vol. 26, Nos. 3-4, pp. 303-317, 2011.
Montross, et al., “Laser shock processing and its effects on microstructure and properties of metal alloys: a review” International Journal of Fatigue 24, pp. 1021-1036, 2002.
Fabbro, et al., “Physical study of laser produced in confined geometry”, Journal of Applied Physics, 68(2), pp. 775-784, 1990.
Sollier, et al., “Numerical modeling of the transmission of breakdown plasma generated in water during laser shock processing”, Eur. Phys. AP, vol. 16, pp. 131-139, 2001.

* cited by examiner

SYSTEM AND METHOD FOR TREATING MATERIAL BY LASER SHOCK UNDER CONFINEMENT IN A LIQUID

CROSS-REFERENCE TO RELATED APPLICATIONS

This application is a National Stage of International patent application PCT/EP2021/085505, filed on Dec. 13, 2021, which claims priority to foreign French patent application No. FR 2013433, filed on Dec. 17, 2020, the disclosures of which are incorporated by reference in their entirety.

FIELD OF THE INVENTION

The present invention relates to the field of the treatment of materials by laser shock, based on the generation of a plasma confined to the surface of the target to be treated, and which generates a shock wave in the material.

BACKGROUND

Laser shock is a laser method making it possible to rapidly apply energy to a target (typically metal or made of composite material) in order to create a plasma of very high pressure. By this method, a very intense shock wave (pressures of the order of a GPa) is generated, making it possible to perform various applications.

One example of system 5 implementing laser shock treatment known from the state of the art is illustrated in FIG. 1. It comprises a pulsed laser L generating a beam B in the form of pulses LP and a concentrating optical device COD of focal length f configured to concentrate the beam B on the surface of the target Tar to be treated. Conventionally, the target is not placed in the focal plane of the device COD, because, for the abovementioned applications, a beam diameter is sought on the surface of the target, at the interface with the confinement medium, that is of the order of a millimeter (typically between 0.3 mm and 10 mm).

The laser creates, by laser ablation, a plasma PLconf of very high pressure. A confinement medium is placed on the laser-ablated surface. The most common and industrially practical confinement is a thin layer CL of a medium that is transparent to the laser (water, other laser-transparent liquid, quartz, polymer adhesive tape, etc.), typically with a thickness of 1 to a few mm. The confined regime makes it possible to considerably increase the pressure of the plasma and its duration of application on the target. Optionally, a heat-protective coating HPC is deposited on the target to be treated. With this system, a very intense shock wave OC is generated, with pressures of the order of a GPa, making it possible to perform different applications.

The laser/material interaction and the laser shock treatment are for example described in the publications:

- Sollier et al: "Laser-matter interaction in laser shock processing", First international symposium on High power laser Macroprocessing, SPIE n° 4831, pages 463-467 (2003),
- J. T Wang et al: "Effects of laser shock peening on stress corrosion behavior of 7075 aluminium alloy laser welded joints", Material Science & Engineering A647 pages 7-14 (2015).

To generate the plasma and therefore the shock wave in good conditions to apply the treatment, a laser should be used with a pulse duration τ typically of between 1 ns and 30 ns and of energy E of between 0.5 and 10 J, focused on the target according to a size of between 0.3 and 10 mm, these different parameters being chosen according to the application targeted.

The main applications are:

- laser shock adhesion and disassembly tests (LASAT—LAser Shock Adhesion Test); two shock waves are generated by two laser pulses that are staggered in time and meet at the junction of the assembly to be tested or to be disassembled, a strong tensile strain is necessary (reference publication: Berthe et al: "State-of-the-art laser adhesion test (LASAT)", Nondestructive Testing and Evaluation, Vol. 26, Nos. 3-4, pages 303-317 (2011)),
- surface strengthening by laser peening (LSP—Laser Shock Peening); the high pressure applied by the plasma, and transmitted to the target via the shock wave, makes it possible to plasticize the target and enhance the properties thereof (strength, lifetime, etc.) (reference publication: Montross et al: "Laser shock processing and its effects on microstructure and properties of metal alloys: a review", International Journal of Fatigue 24, pages 1021-1036 (2002)),
- characterization of materials under high pressures.

These applications primarily relate to scientific research and different areas of industrial activities such as aeronautics, nuclear or naval.

The parameter that is important for these systems is the power density or intensity I irradiating the target expressed in $GW/cm^2$, since the pressure generated is proportional to the square root of the laser intensity (see for example the publication by Fabbro et al: "Physical study of laser produced plasma in confined geometry", Journal of Applied Physics, 68(2), pages 775-784 (1990)).

$$P \propto \sqrt{I}$$

with the laser intensity I ($GW/cm^2$) defined according to the formula:

$$I = \frac{E}{\tau S} \tag{1}$$

in which E is the laser energy per pulse (J), τ the laser pulse duration (ns) and S the surface area irradiated by the laser ($cm^2$)

However, it is not possible to indefinitely increase the pressure generated by increasing the laser intensity irradiating the target because the laser intensity transmitted to the target saturates through a breakdown mechanism occurring on the surface of the confinement. In fact, the regime of laser/material interaction in the laser shock involves two different types of plasmas: the confined plasma PLconf which develops at the surface of the target, that is to say the target-confinement liquid interface, illustrated in FIG. 1, and a breakdown plasma PLbk/s occurring on the surface of the liquid, illustrated in FIG. 2 and due to a phenomenon of ionization of the confinement medium.

This breakdown plasma is for example studied in the publication by Sollier et al "Numerical modeling of the transmission of breakdown plasma generated in water during laser shock processing", Eur. Phys. AP, vol 16, pages 131-139 (2001).

The breakdown plasma PLbk/s which appears is opaque to the laser radiation and thus absorbs the remainder of the energy contained in the laser pulse. This breakdown phenomenon results in the maximum intensity irradiating a target by confined laser shock being bounded by the breakdown threshold intensity in the confinement medium. This phenomenon can be seen in FIG. 5 of the abovementioned publication: above a threshold incident intensity on the surface of the confinement medium (here water), that will be called Ibk, of approximately 8 GW/cm$^2$ (with for example: $\lambda$=1064 nm and $\tau$=25 ns) the intensity of the pulse transmitted by the confinement medium saturates while the incident intensity increases.

Consequently, the maximum pressure that can be generated by laser shock is thus bounded. Since the thickness of the layer of water is small compared to the focal length used (1 to 3 mm of thickness versus a focal length of 300 to 500 mm for example), it can be considered that the intensity on the surface of the target Ist is substantially equal to the intensity on the surface of the water Isl, and therefore that the maximum intensity that can be applied to the surface of the target is also 8 GW/cm$^2$. With this applied intensity of 8 GW/cm$^2$, the maximum pressure obtained by laser shock within the 5-15 ns pulse duration range is approximately 8 GPa.

To be able to disassemble certain strong or thick assemblies, the pressures obtained these days by laser shock are too low. Likewise, it generally takes a pressure greater than 2.5 times the yield strength to be able to optimally reinforce the target by laser peening, and the current pressures do not therefore make it possible to treat all materials, notably the strongest materials.

Thus, being able to increase the maximum pressure value would make it possible to address needs that exist and are as yet unsatisfied.

A few solutions are now possible to increase the pressure on the target:

Reduction of the laser pulse duration.

It is demonstrated in the literature (experimentally and theoretically) that, in a given confinement medium, the breakdown threshold laser intensity Ipk is inversely proportional to the square root of the laser pulse duration ($I_{pk} \propto I/\sqrt{\tau}$). Thus, to increase the maximum laser intensity irradiating the target (and therefore the maximum pressure created), one solution is to reduce the pulse duration of the laser system used since the breakdown threshold intensity will increase.

However, although this solution makes it possible to increase the maximum pressure generated by the plasma, it poses problems of visibility and utility: indeed, the duration of the shock wave depends on the duration of the laser pulse (approximately two times its value), and the damping of a shock wave increases all the more as its duration decreases. The wave thus generated will be damped more rapidly in the treated target (because the laser pulse duration has been reduced) and the "useful" pressure (at the core of the material, and not on the surface) will therefore not be increased, will even have reduced.

Use of the so-called direct regime:

A second solution consists in dispensing with the confined regime, and using the direct irradiation regime: there is therefore no longer confinement around the target to increase its pressure. The direct regime does however make it possible to obtain pressures similar to the confined regime by using laser intensities 10 to 100 times higher. On the other hand, a high vacuum must be produced around the target to avoid any phenomenon of breakdown in air, which is highly probable at these intensity levels. This second solution is difficult to apply industrially because it requires, on the one hand, creating the vacuum around the part to be treated, and, on the other hand, necessitates laser systems of very high energy, and therefore that are costly and bulky.

Use of a magnetic or electrical field (patent N$^o$ CN201210571521 and N$^o$ U.S. Ser. No. 10/745,776) at the time of creation of the plasma, to apply (by transfer) an additional energy to the plasma. However, these solutions have not given convincing results and do not significantly increase the pressure levels generated or are too complicated to implement and calibrate.

SUMMARY OF THE INVENTION

One aim of the present invention is to remedy the abovementioned drawbacks by proposing a system that makes it possible to increase the maximum intensity at the surface of the target, and therefore increase the pressure transmitted to the target by laser shock. Moreover, the system according to the invention is cost-effective because it does not require modifying the lasers used in the existing laser shock systems.

The subject of the present invention is a system for treating a target by laser shock in a regime of confinement in a liquid, the system comprising:

- a pulsed laser generating a beam having a pulse duration $\tau$ of between 1 ns and 30 ns and a wavelength $\lambda$,
- a concentrating optical device having a focal length f and configured to concentrate the beam on the surface of the target, the incident laser beam on the concentrating device having a diameter D,
- a tank filled with said liquid having a refractive index n,
- a desired value of the diameter of the beam on a surface of the target being predetermined and named Dst,
- a thickness e of liquid passed through by the beam before reaching the surface of the target being chosen such that a laser intensity on the surface of the liquid is less than or equal to a laser intensity on the surface of the target divided by 2.

According to a preferred embodiment, the thickness e is chosen to be greater than or equal to a minimum thickness $e_{min}$ defined by:

$$e_{min} = \frac{D_{st}(\sqrt{2}-1)}{2\tan\left(\arcsin\left(\frac{\arctan\left(\frac{D}{2f}\right)}{n}\right)\right)}$$

According to one embodiment, the system according to the invention further comprises an element configured to homogenize the beam and disposed on the optical path of said beam.

According to one embodiment, an energy E of the laser and the concentrating optical device are configured such that the laser intensity on the surface of the target is between 0.1 GW/cm$^2$ and 25 GW/cm$^2$ and said predetermined value Dst is between 0.3 and 10 mm.

According to one embodiment, the liquid has an absorption coefficient at said wavelength of less than or equal to 0.1/m$^2$.

According to one embodiment, the liquid is water and the wavelength $\lambda$ of the laser lies within the range [350 nm; 600 nm].

According to another aspect, the invention relates to a method for treating a target by laser shock in a regime of confinement in a liquid comprising:

having a tank filled with said liquid and containing the target, generating a beam, having a pulse duration τ of between 1 ns and 30 ns with a pulsed laser, concentrating the beam on the surface of the immersed target with a concentrating optical device of focal length f, the incident beam on the concentrating optical device having a diameter D, positioning the target in the tank then illuminating the surface with the beam, such that the beam passes through a thickness e of liquid at least equal to a minimum thickness $e_{min}$ before reaching the surface of the target and such that the diameter of the beam on the surface of the target is equal to a predetermined value Dst, the minimum thickness of liquid $e_{min}$ being defined by:

$$e_{min} = \frac{D_{st}(\sqrt{2}-1)}{2\tan\left(\arcsin\left(\frac{\arctan\left(\frac{D}{2f}\right)}{n}\right)\right)}$$

a laser intensity on the surface of the liquid being then strictly less than a laser intensity on the surface of the target divided by 2.

The following description presents several exemplary embodiments of the device of the invention: these examples are nonlimiting on the scope of the invention. These exemplary embodiments present both the essential features of the invention and additional features linked to the embodiments considered.

BRIEF DESCRIPTION OF THE DRAWINGS

The invention will be better understood and other features, aims and advantages thereof will emerge from the following detailed description and in light of the attached drawings given as nonlimiting examples and in which.

DETAILED DESCRIPTION

The invention is founded on a study of the inventors relating to the breakdown mechanism in the laser shock system.

First of all, the works of the inventors made it possible to demonstrate for the first time that there are in fact two breakdown modes, breakdown via the surface of the confinement medium, known from the state of the art, and breakdown in the volume of the confinement medium. This in-volume breakdown has not been studied in the laser shock architectures because the confinement layers used are always very thin, with thicknesses for which this breakdown does not occur. This in-volume breakdown becomes visible when the thickness of the confinement medium passed through is increased.

Figure 1:
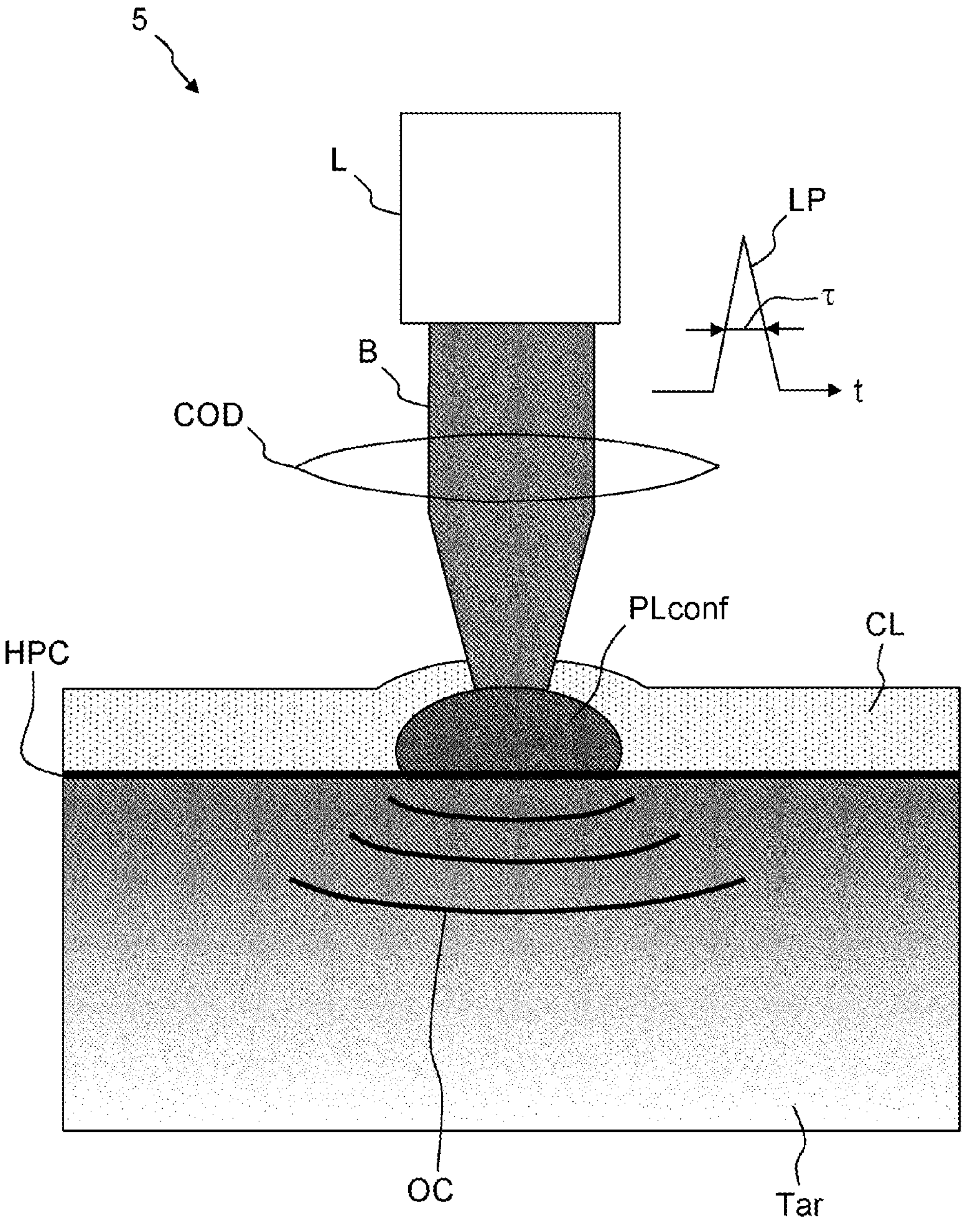
FIG. 1, already cited, illustrates a laser shock characterization system according to the state of the art.
Figure 2:
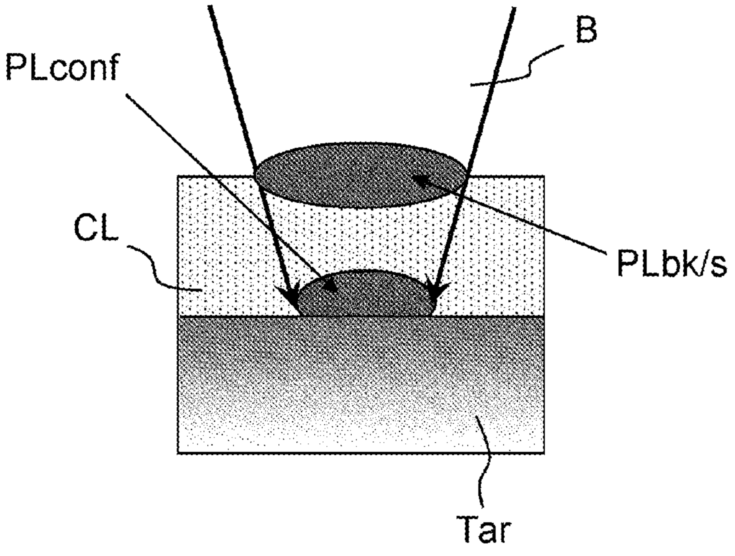
FIG. 2, already cited, illustrates the two plasmas involved in the laser shock mechanism.
Figure 3:
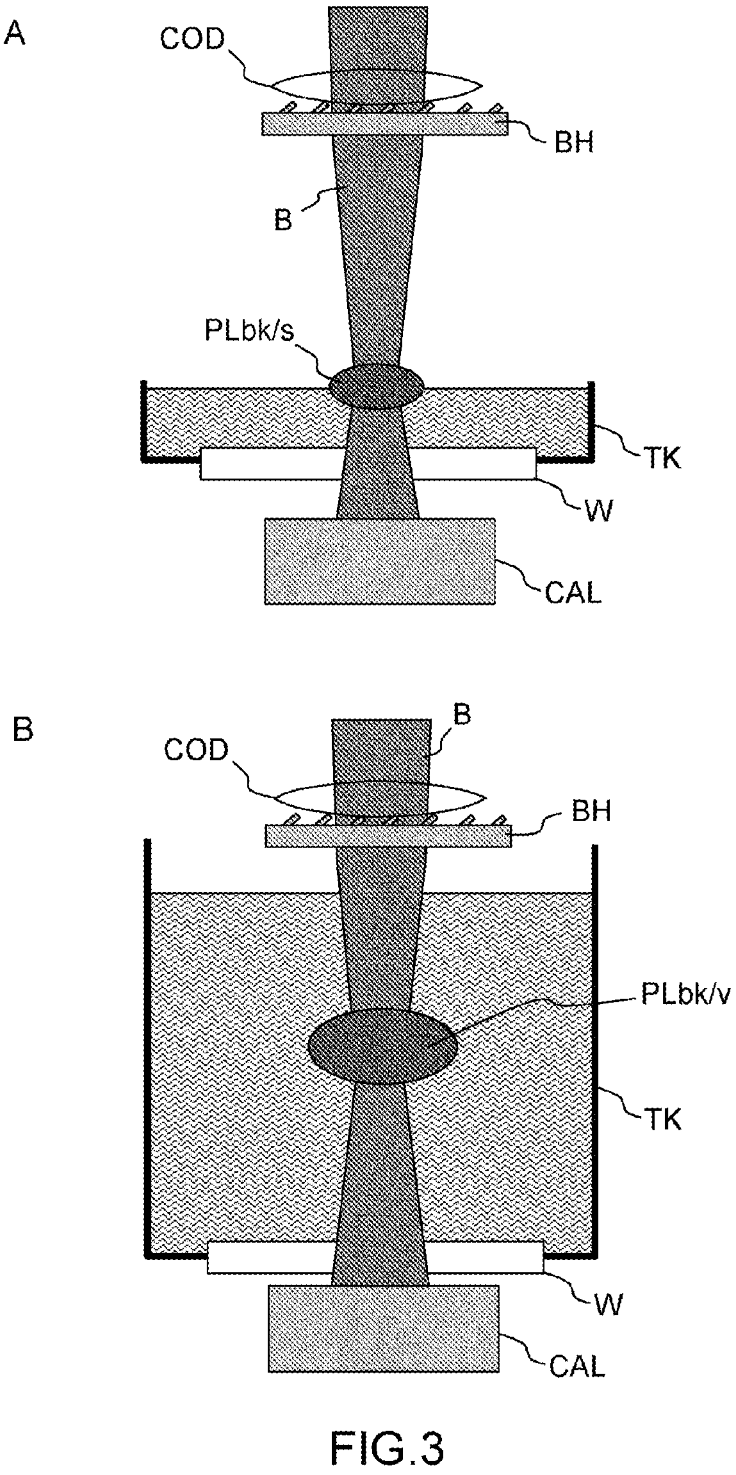
FIG. 3 illustrates the measurement protocol used to demonstrate the existence of a volume breakdown mechanism.

The inventors have revealed by experimentation the existence of this in-volume breakdown mechanism by the measurement protocol schematically represented in FIG. 3. The part A corresponds to the situation according to the state of the art (small thickness of water, here 2 mm) and the part B to a measurement carried out with a greater thickness of water (15 cm).

In both cases, a transmission T=Et/Ei is measured, with Ei the incident energy on the outer surface of the confinement medium and Et the energy transmitted after passing through the thickness of liquid. The energy Ei is known and the measurement of Et is performed with a calorimeter CAL recovering the beam transmitted via a window W focused at the bottom of the tank TK.

For this measurement there is a wavelength of 532 nm, a pulse duration τ of 7.2 ns, a beam having an initial diameter of 20 mm and a concentrating device with a focal length of f=80 mm. Here, an element BH (typically a DOE, for "Diffractive Optical Element") is used, configured to homogenize the beam and disposed on the optical path of the beam.

Figure 4:
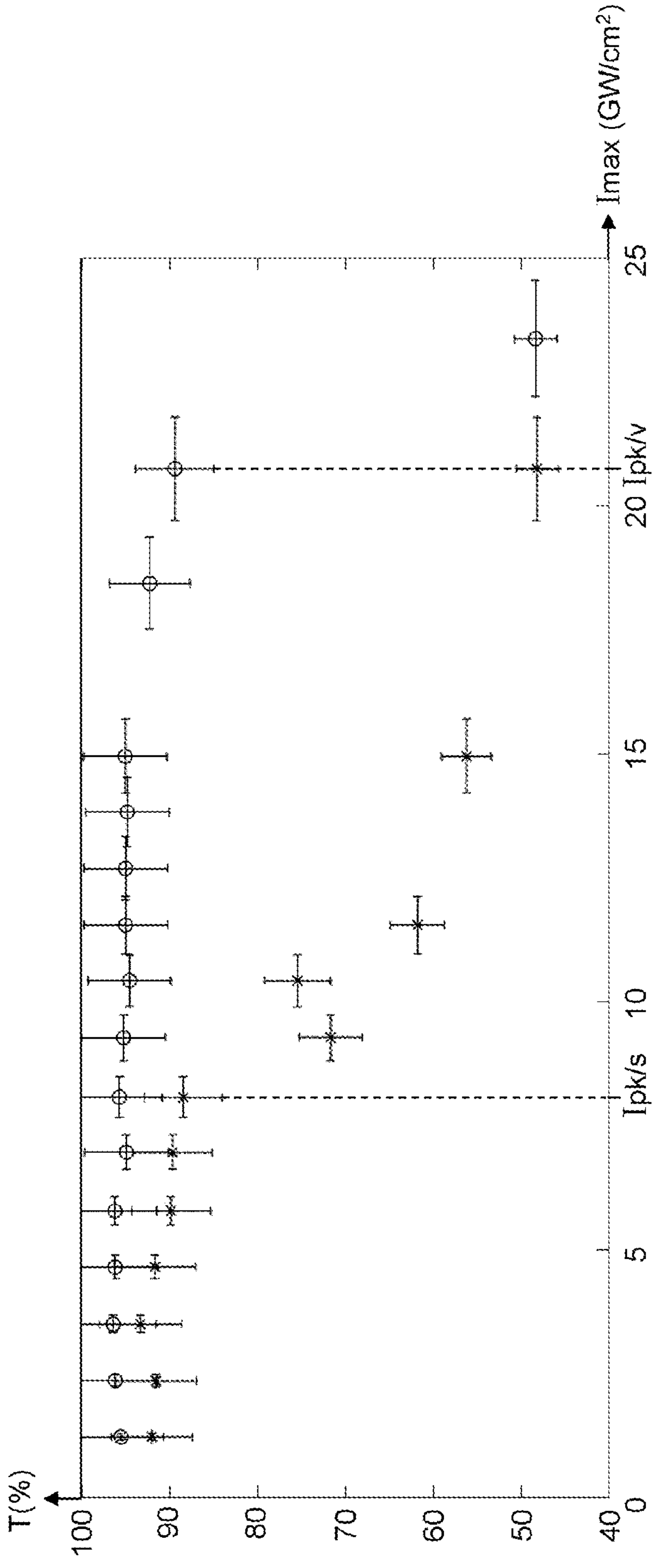
FIG. 4 illustrates the trend of the transmission as a function of the maximum intensity Imax reached in the confinement medium, for the two cases (cross points 2 mm layer of water, circle points 15 cm layer of water).

FIG. 4 illustrates the trend of the transmission T as a function of the maximum intensity Imax reached in the confinement medium, obtained for a given intensity on the surface of the liquid Isl, that is made to vary (via the variation of the energy of the laser). The intensity Isl is easily deduced from Ei with the formula (1) and the knowledge of the diameter of the beam on the surface.

In the case A, since the liquid thickness is thin, the intensity is substantially identical everywhere, on the surface of the liquid or in the depth of the tank. The intensity Imax is therefore considered as the incident intensity on the surface of the liquid Isl: Imax≅Isl. This intensity Imax will also be equal to that on the surface of the target in contact with the confinement medium, named Ist, when there is a target.

For the case B, the system COD combined with the element BH is configured to concentrate the light according to a known minimum diameter of 1.5 mm in the volume of the liquid. Knowing the incident energy and the minimum diameter the associated intensity Imax is deduced therefrom.

Thus, the x axis Imax of FIG. 4 corresponds to the maximum intensity obtained in the liquid (either on the surface or in the volume).

This intensity Imax obtained in the liquid is therefore potentially the maximum intensity that can be obtained on the surface of the target for the generation of the shock wave.

In FIG. 4, the cross points correspond to the values obtained with the measurement according to A and the circle points to the values obtained with the measurement according to B.

With the crosses, the phenomenon of surface breakdown known from the state of the art is observed again, with an experimental threshold, that will be called Ibk/s, around 8 GW/$cm^2$. This result is consistent with the results obtained by Arnaud Sollier (see abovementioned publications) describing the occurrence of a breakdown plasma on the surface of the confinement medium for breakdown intensity thresholds between 4 and 10 GW/$cm^2$ as a function of the laser parameters used.

The innovative point is the variation of T obtained with the circles, which reveals a new threshold, that will be called Ibk/v, corresponding to a breakdown in the volume of the liquid, emerging at the point where the intensity is highest. This threshold is approximately 20-21 GW/cm$^2$, i.e. greater than Ibk/s.

Thus, with this measurement, the inventors have demonstrated that there are two breakdown thresholds and not just one: a surface breakdown threshold that will be called Ibk/s and a volume breakdown threshold Ibk/v. Furthermore, these measurements have made it possible to determine a value of these two thresholds, for a same laser pulse duration and a same wavelength, and to deduce therefrom that the volume threshold is higher than the surface threshold: Ibk/v>Ibk/s.

The ratio $$R = \frac{I_{bk/v}}{I_{bk/s}}$$

is defined.

For the pairing (τ=7.2 ns; λ=532 nm) R≅2.5.

The existence of this ratio R combined with the fact that it is greater than 1 is a significant result. It means that, when a greater thickness of confinement material is used, it is possible to obtain on the target an intensity Ist that is greater before breakdown than when using a small thickness.

The highlighting of these two breakdown thresholds, one on the surface, predominant when the confinement layer is thin, and the other in the volume, occurring when the confinement layer becomes thicker, and the experimental determination of the parameter R>1 linking the two thresholds, is a true discovery which had never hitherto been revealed.

In other words, these works demonstrate for the first time that, given constant laser parameters, the breakdown threshold in the confinement medium is greater if the breakdown occurs in the volume of the confinement medium rather than on its surface (typically from 8-10 GW/cm$^2$ to 20-25 GW/cm$^2$ for pulses of 7.2 ns with water confinement).

With a thickness e of the confinement medium passed through that is sufficient, a breakdown on the surface of the confinement medium is avoided (the laser is not yet focused on the surface, therefore the laser intensity is locally low there), this breakdown being transferred into the volume at the core of the confinement medium, where the breakdown threshold intensity is higher than on the surface. Thus, the maximum intensity that can irradiate the target (for a same set of laser parameters) is increased, therefore the maximum pressure generated is also increased. In the preceding example with an in-volume breakdown it is possible to transmit a pressure to the target of 12 GPa (corresponding to the threshold intensity of 20-22 GW/cm$^2$), compared to 8 GPa (8-10 GW/cm$^2$) with the conventional surface breakdown.

Several other experimental measurements and physical deductions show that the value of this ratio R depends on the confinement material considered and remains relatively stable over a pulse duration range [1-30 ns]. For water, R lies between 2.5 and 3. More generally for the laser conditions and the confinement materials of interest in laser shock, the inventors have determined that R typically lies between 2 and 4.

From the fact that R>1, it is deduced that, if there is a breakdown on the surface, the maximum intensity which will be reached will be $I_{bk/s}$ and the intensity on the target is at most equal to $I_{bk/s}$. Likewise, for a breakdown in the volume, the maximum target intensity is at most equal to $I_{bk/v}$. To maximize the maximum intensity on the target, it is therefore necessary to be in the conditions to have a breakdown in volume, and this breakdown will take place at the target by positioning the latter at the point where the laser is the most concentrated (strongest intensity).

In other words, the laser shock system must therefore be designed so that, when the intensity on the target (Ist) has the value $I_{bk/v}$, there is less than $I_{bk/s}$ on the surface of the confinement medium (Isl). Indeed, if such were not the case, that would mean for example that, when there is $I_{bk/v}$ on the target, there is already more than $I_{bk/s}$ on the surface . . . therefore there is already a breakdown on the surface, therefore it is not possible in fact for there to be $I_{bk/v}$ on the target (absurd).

That means therefore that the following must apply:

$$I_{sl} \leq \frac{I_{st}}{R}; \quad (2)$$

The realization of the condition (2) ensures that, when there is a surface breakdown ($I_{sl}=I_{bk/s}$) then the intensity on the target is at least equal to $I_{bk/v}$, and therefore in fact there is a breakdown in volume before the breakdown on the surface: the possible intensity on the target has been maximized (since the threshold is higher in volume than on the surface, the conditions must be such that the breakdown occurs first of all in the volume, which is never the case with a water thickness of 1 mm).

A minimum value of R, Rmin=2, has been determined experimentally.

Thus, the laser shock system satisfies:

$$I_{sl} \leq \frac{I_{st}}{2} \quad (3)$$

These intensities, on the surface of the liquid and in the liquid on the surface of the target, can be measured for example with a Joule meter or a photodiode.

Given what is explained above, there will therefore always be a breakdown in volume for the lasers and the confinement media of interest.

The observance of this condition (3) is a result obtained by the inventors which makes it possible to produce a design of the laser shock system according to the invention, which prioritizes the breakdown in volume. The laser shock system according to the invention exploits the experimental demonstration of the existence of a higher breakdown threshold in volume than on the surface of the confinement medium.

Figure 5:
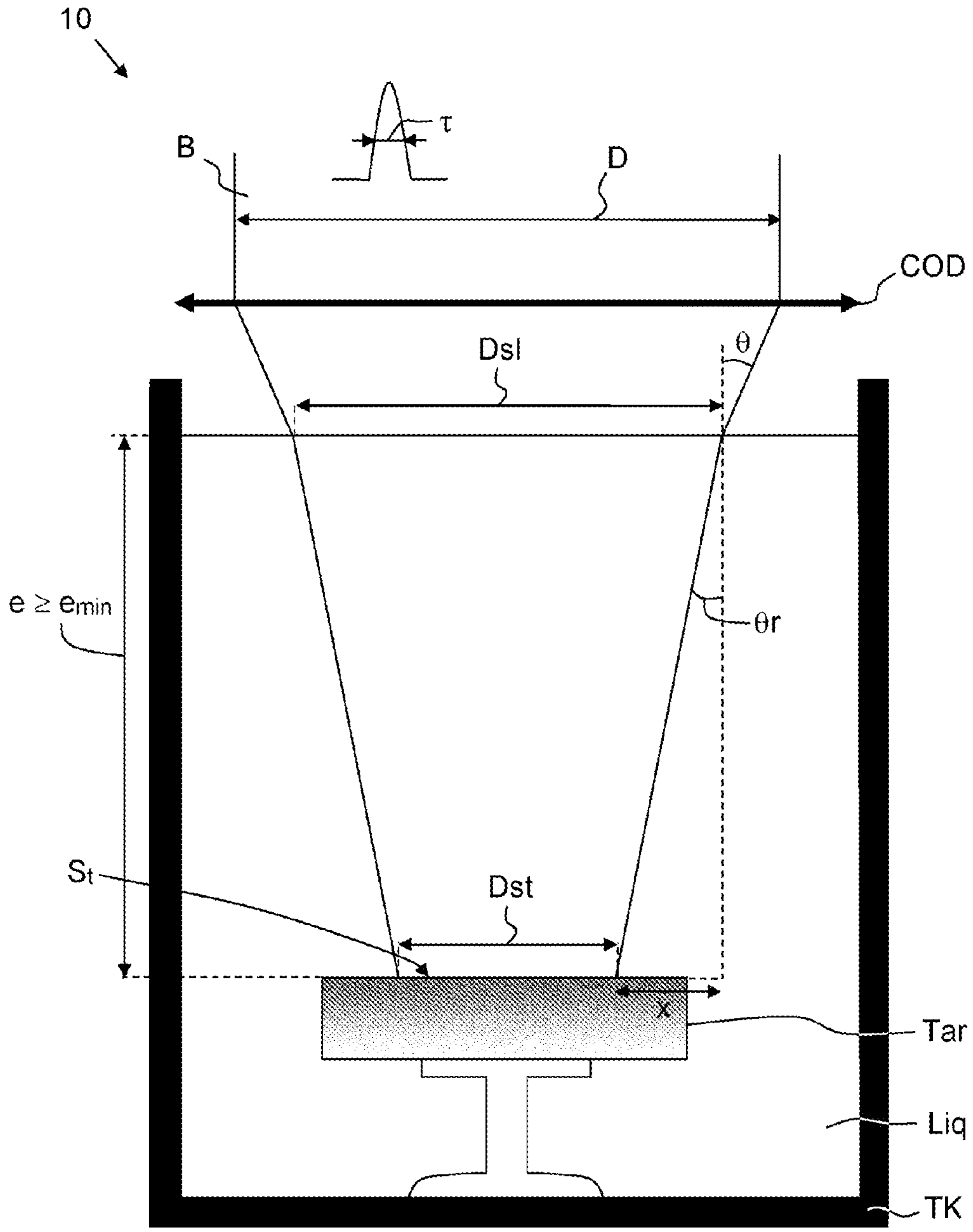
FIG. 5 illustrates a system for treating a target by laser shock according to the invention.

The invention relates to a system 10 for treating a target Tar by laser shock in a regime of confinement in a liquid Liq as illustrated in FIG. 5. The system comprises a pulsed laser L generating a beam B having a pulse duration τ of between 1 ns and 30 ns and a wavelength λ and a concentrating optical device COD having a focal length f and configured to concentrate the beam B on the surface St of the target. The incident laser beam on the concentrating device COD has a diameter D. The system also comprises a tank TK filled with said liquid, the liquid having an index n.

In a laser shock system, the diameter of the beam Dst on the surface St of the target which is illuminated by the beam constitutes an input parameter, which is a function of the application and of the nature of the material treated. Practically, this desired diameter Dst varies between 0.3 mm and 10 mm, preferably between 0.8 and 5 mm.

From the input parameters (D, f, n, Dst) the target is disposed in the tank such that the beam passes through a thickness e of liquid, before reaching the surface St of the target, chosen in order for a laser intensity on the surface of the liquid (Isl) to be less than or equal to a laser intensity on the surface of the target (Ist) divided by 2 (condition (3)).

With the input parameters set, observing the condition (3) makes it possible to determine a minimum thickness $e_{min}$ of liquid to be observed.

The following applies:

$$\tan(\theta) = \frac{D}{2f} \tag{4}$$

and $$\tan(\theta_r) = \frac{x}{e}$$

(see FIG. 5)

And with the laws of refraction:

$$\sin(\theta) = n \sin(\theta_r) \tag{5}$$

n the refractive index of the liquid.

In addition:

$$D_{st} = D_{sl} - 2e\tan(\theta_r) \tag{6}$$

The intensity I is defined by:

$$I = \frac{E}{S\tau}$$

with E the energy of the laser per pulse (J), τ the pulse duration (ns), S the irradiated surface (cm).

Therefore $$I \propto \frac{1}{DE^2},$$

in which DE is the diameter of the illuminated surface

From the relationship (2) the following is deduced: $RD^2_{st} \leq D^2_{sl}$ hence $$\sqrt{R}D_{st} \leq D_{sl}$$

From the relationship (6) the following is deduced: $(\sqrt{R}-1)D_{st} \leq 2e\tan(\theta_r)$ $$=> e \geq \frac{D_{st}(\sqrt{R}-1)}{2\tan(\theta_r)} \tag{7}$$

With the relationships (4) and (5) tan(Or) can be expressed as a function of the parameters D, f and n, which culminates in:

$$e \geq \frac{D_{st}(\sqrt{R}-1)}{2\tan\left(\arcsin\left(\frac{\arctan\left(\frac{D}{2f}\right)}{n}\right)\right)} \tag{8}$$

By taking the minimum value of R, i.e. Rmin=2, a value of $e_{min}$ is deduced therefrom which is sufficient for all the systems of interest:

$$e_{min} = \frac{D_{st}(\sqrt{2}-1)}{2\tan\left(\arcsin\left(\frac{\arctan\left(\frac{D}{2f}\right)}{n}\right)\right)} \tag{9}$$

The laser system must be configured such that the thickness e of liquid passed through by the beam before reaching the surface of the target is chosen to be greater than or equal to $e_{min}$. In this case, the laser intensity on the surface of the liquid Isl is less than or equal to a laser intensity on the surface of the target Ist divided by 2.

The thickness $e_{min}$ depends on the parameters D, f, n and Dst of the system 10. As an example, for D=20 mm, f=500 mm n=1.33 (water) and Dst=4 mm, $e_{min}$=55 mm.

In practice, the system 10 will be dimensioned by taking, for example, 10-15 cm of water to cover all of the cases of interest while ensuring observance of the condition (3).

It should be noted that the above calculation is valid for a Gaussian laser beam provided that the far field mode is being used (that is to say, far from the "waist", where the laser has a few microns of diameter, to the focus of the lens). In a laser shock system, these conditions always apply (laser spot Dst≥300 μm).

For the small angles, the formula (9) is simplified:

$$e_{min} = \frac{D_{st}(\sqrt{2}-1)}{2} * \sqrt{4N^2n^2-1} \tag{10}$$

With N=f/D

The dimensioning of the laser shock system according to the invention links the numerical aperture of the system (ON=D/2f) to the thickness of liquid used to move the breakdown on the surface of the confinement into the volume of the confinement.

In the formula (9), it can be seen that the system/water thickness depends on the size of the spot Dst, that is to say that, if 3 mm is needed to treat titanium and 1 mm to treat aluminum, two different minimum tank thicknesses are determined. In practice, the manufacturer designing the laser shock system will use the same tank, which has a thickness greater than the greatest $e_{min}$, and its tank will be functional for both materials.

The laser system according to the invention can be adapted to the numerical aperture (D/2f) of the system used, according to the needs, by determining the minimum thickness of the liquid to be used in order to move the breakdown away from the surface to the volume.

It should be noted that the system 10 according to the invention is compatible with an architecture in which e=f, which corresponds to a device COD immersed in the tank, provided that e satisfies the condition e $e_{min}$.

At the other extreme, the system 10 is compatible with a relatively small water layer thickness provided that a COD optic that is very open is considered, which guarantees that $$I_{sl} \leq \frac{I_{st}}{2}.$$

This configuration does however present the drawback of bringing the optic closer to the target, which is not desirable.

Generally, the more open the optic of the COD, the more the thickness of the confinement layer can be reduced. A water height of around 10-15 cm induces a small aperture D/2f, which is an advantage because a significant aperture can damage the optics, because they will be close to the target (ejection of water and of metal particles, by the plasma for example). In addition, with a water height typically of at least 10 cm, the splashes on the lens are non-existent. The parameters D and f of the system are typically a laser beam with a diameter on the COD of between 15 and 30 mm and a focusing distance of approximately 20-30 cm.

Thus, a laser shock system 10 designed according to the invention makes it possible to avoid a breakdown on the surface of the confinement medium (the laser is not yet focused on the surface, therefore the laser intensity is locally too small thereon to initiate a breakdown). This breakdown is moved into the volume at the core of the confinement medium, with a higher threshold intensity. Thus, the maximum intensity that can irradiate the target (for a same set of laser parameters) is increased, therefore the maximum pressure generated is also increased.

With a laser system according to the invention, the pressures generated are significantly increased (approximately +50%). This system is relatively simple to implement. It uses lasers and existing concentrating devices and a tank filled typically by 10-15 cm of a confinement liquid in which the target is immersed.

Figure 6:
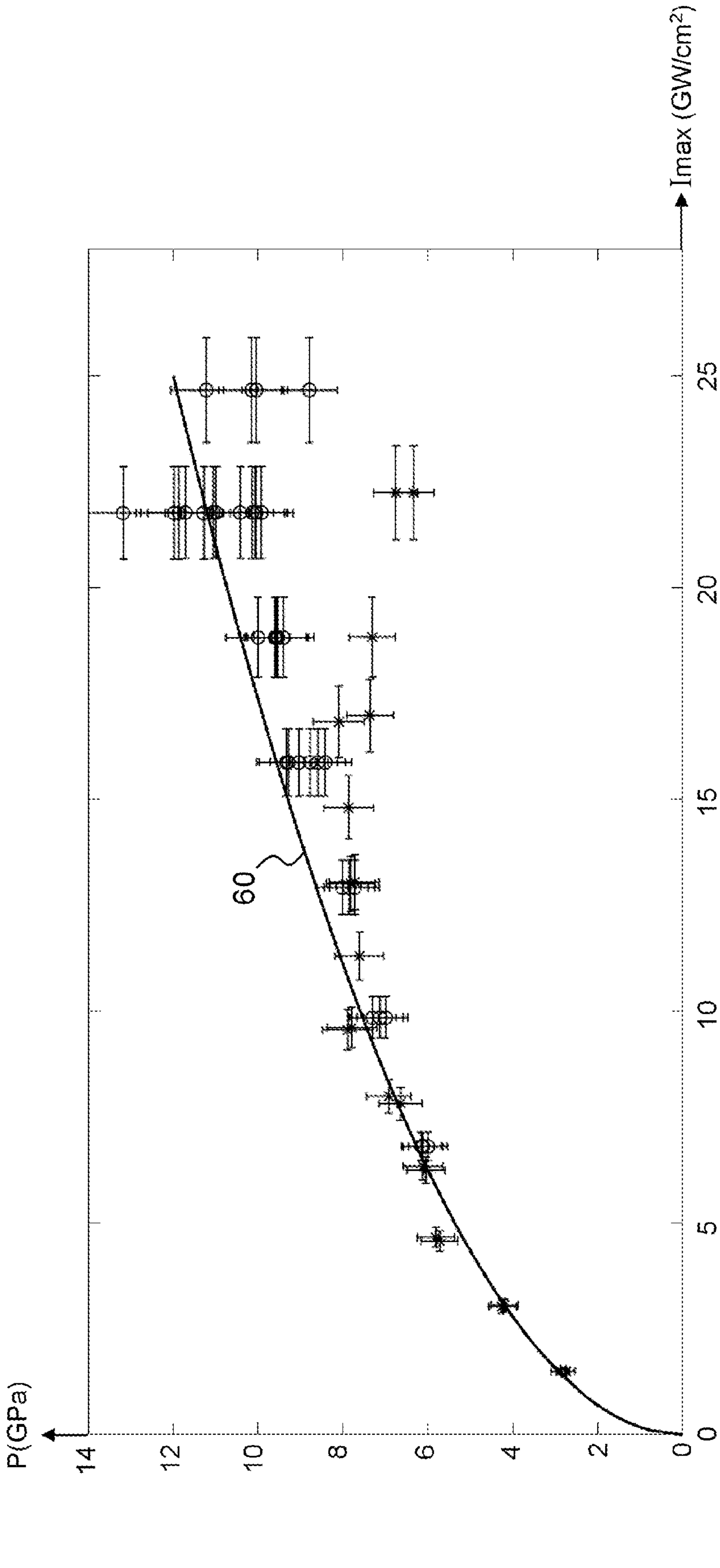
FIG. 6 illustrates the pressure applied via the confinement plasma as a function of the maximum intensity reached in the confinement medium, for the two preceding cases (cross points 2 mm layer of water, circle points 15 cm layer of water).

FIG. 6 illustrates the pressure P applied via the confinement plasma as a function of Imax for the preceding two cases (cross points 2 mm layer of water, circle points 15 cm layer of water). The curve 60 is a numerical simulation based on a calculation done with a laser/material interaction 1D code which does not take account of the breakdown phenomena (just the pressure resulting from a given incident laser pulse, absorbed by the target, is calculated).

For the case of a thin layer (crosses) it is observed that, beyond an intensity of approximately 10 $GW/cm^2$ (corresponding to Ibk/s), the pressure generated stagnates at approximately 8 GPa then decreases. The breakdown on the surface limits the intensity illuminating the target. For a thicker layer (circles), the pressure generated follows the increasing of Imax at least up to 22 $GW/cm^2$ and reaches a value of 12 GPa, i.e. an increase of more than 40% compared to the thin layer. Furthermore, the trend follows the theoretical curve for a longer time without breakdown which clearly shows that the problems linked to breakdown are moved to the higher intensities.

According to one embodiment, the system 10 further comprises an element BH configured to homogenize the beam and disposed on the optical path of said beam. The presence of a beam homogenizer (typically a DOE) makes it possible to ensure there will not be any overintensities in the spatial profile of the laser, and therefore avoid local breakdowns (which would lead to a local loss of intensity transmitted to the target).

In order to produce a laser shock, preferentially the energy E of the laser (per pulse) and the concentrating optical device are configured such that the laser intensity on the surface of the target Ist is between 0.1 $GW/cm^2$ and 25 $GW/cm^2$ and the Dst value is between 0.3 and 10 mm.

According to one embodiment, the pairing (λ, liquid) is chosen such that the liquid Liq has an absorption coefficient $\alpha(\lambda)$ of less than or equal to $0.1/m^2$, that is to say uses a wavelength that is absorbed a little by the confinement medium.

Preferentially, the liquid is water and the wavelength λ of the laser lies within the range [350 nm; 600 nm]. The wavelength of 532 nm is preferred, compared to the wavelength of 1064 nm frequently used in laser shock with a thin layer of water.

According to another aspect, the invention relates to a method for treating a target Tar by laser shock in a regime of confinement in a liquid Liq comprising:

having a tank filled with said liquid Liq and containing the target Tar, generating a beam B having a pulse duration of between 1 ns and 30 ns with a pulsed laser, concentrating the beam B on the surface of the immersed target with a concentrating optical device COD of focal length f, the incident beam on the concentrating optical device having a diameter D, positioning the target in the tank then illuminating the surface with the beam, such that the beam passes through a thickness e of liquid chosen such that a laser intensity on the surface of the liquid Isl being then strictly less than a laser intensity on the surface of the target Ist divided by 2.

The invention claimed is:

1. A system for treating a target (Tar) by laser shock in a regime of confinement in a liquid (Liq), the system comprising:

a pulsed laser (L) generating a beam (B) having a pulse duration t of between 1 ns and 30 ns and a wavelength λ, a concentrating optical device (COD) having a focal length f and configured to concentrate the beam (B) on the surface (St) of the target, the incident laser beam on the concentrating device having a diameter D, a tank (TK) filled with said liquid having a refractive index n, a desired value of the diameter of the beam on a surface (St) of the target being predetermined and named Dst, a thickness e of liquid passed through by the beam before reaching the surface of the target being chosen such that a laser intensity on the surface of the liquid (Isl) is less than or equal to a laser intensity on the surface of the target (Ist) divided by 2.

2. The system as claimed in claim 1, wherein the thickness e is chosen to be greater than or equal to a minimum thickness $e_{min}$ defined by:

$$e_{min} = \frac{D_{st}(\sqrt{2}-1)}{2\tan\left(\arcsin\left(\frac{\arctan\left(\frac{D}{2f}\right)}{n}\right)\right)}.$$

3. The system as claimed in claim 1, further comprising an element (BH) configured to homogenize the beam and disposed on the optical path of said beam.

4. The system as claimed in claim 1, wherein an energy E of the laser and the concentrating optical device are configured such that the laser intensity on the surface of the target (Ist) is between 0.1 $GW/cm^2$ and 25 $GW/cm^2$ and said predetermined value Dst is between 0.3 and 10 mm.

5. The system as claimed in claim 1, wherein the liquid has an absorption coefficient (α) at said wavelength λ of less than or equal to $0.1/m^2$.

6. The system as claimed in claim 1, wherein the liquid is water and the wavelength λ of the laser lies within the range [350 nm; 600 nm].

7. A method for treating a target (Tar) by laser shock in a regime of confinement in a liquid (Liq) comprising:

having a tank filled with said liquid and containing the target, generating a beam (B) having a pulse duration t of between 1 ns and 30 ns with a pulsed laser, concentrating the beam (B) on the surface of the immersed target with a concentrating optical device (COD) of focal length f, the incident beam on the concentrating optical device having a diameter D, positioning the target in the tank then illuminating the surface with the beam, such that the beam passes through a thickness e of liquid at least equal to a minimum thickness $e_{min}$ before reaching the surface of the target and such that the diameter of the beam on the surface of the target (St) is equal to a predetermined value Dst, the minimum thickness of liquid $e_{min}$ being defined by:

$$e_{min} = \frac{D_{st}(\sqrt{2} - 1)}{2\tan\left(\arcsin\left(\frac{\arctan\left(\frac{D}{2f}\right)}{n}\right)\right)}$$

a laser intensity on the surface of the liquid (Isl) then being strictly less than a laser intensity on the surface of the target (Ist) divided by 2.

* * * * *